United States Patent [19]

Foster

[11] Patent Number: 4,576,316

[45] Date of Patent: Mar. 18, 1986

[54] DISPENSING BAG

[75] Inventor: Robert D. Foster, St. Anns, Canada

[73] Assignee: Spred-A-Bag Inc., St. Anns, Canada

[21] Appl. No.: 641,479

[22] Filed: Aug. 16, 1984

Related U.S. Application Data

[60] Division of Ser. No. 386,537, Jun. 9, 1982, Pat. No. 4,486,187, which is a continuation-in-part of Ser. No. 159,438, Jun. 13, 1980, abandoned.

[51] Int. Cl.[4] .............................................. B65D 47/10
[52] U.S. Cl. .................................. 222/541; 222/565; 222/465 R; 383/121; 383/103; 383/10; 206/484
[58] Field of Search .................... 383/121, 103, 21, 10, 383/6, 7; 206/484; 222/107, 175, 196.1, 196.5, 202, 203, 480, 465 R, 565, 541

[56] References Cited

U.S. PATENT DOCUMENTS

| | | | |
|---|---|---|---|
| 506,892 | 10/1893 | Diamond | 222/565 |
| 1,123,010 | 12/1914 | Richardson | 222/107 X |
| 1,729,213 | 9/1929 | Ford | 222/107 |
| 2,325,942 | 8/1943 | Drake . | |
| 2,332,768 | 10/1943 | Wilcox | 222/565 |
| 2,442,646 | 6/1948 | Fields | 222/480 |
| 2,758,773 | 8/1956 | Gibbons | 206/620 |
| 2,873,566 | 2/1959 | Sylvester et al. | 53/29 |
| 3,159,096 | 12/1964 | Tocker | 100/211 |
| 3,239,110 | 3/1966 | Buter | 222/541 |
| 3,246,803 | 4/1966 | Laub, Jr. . | |
| 3,258,169 | 6/1966 | Paisley | 222/107 |
| 3,316,839 | 5/1967 | Lake | 222/107 |
| 3,369,709 | 2/1968 | Clauss | 222/107 |
| 3,402,749 | 9/1968 | Kinzler | 383/107 |
| 3,406,873 | 10/1968 | Zackheim | 222/107 |
| 3,463,358 | 8/1969 | Wenzler | 222/541 |
| 3,567,074 | 3/1971 | Brown | 222/107 |
| 3,688,973 | 9/1972 | Lillkrist | 383/7 |
| 3,791,570 | 2/1974 | Hopkins | 222/107 |
| 3,930,286 | 1/1976 | McGowen | 383/10 |
| 4,181,069 | 1/1980 | Porter | 93/35 |
| 4,262,581 | 4/1981 | Ferrell | 493/188 |
| 4,394,936 | 7/1983 | Shavit | 222/107 |

FOREIGN PATENT DOCUMENTS

| | | | |
|---|---|---|---|
| 894640 | 3/1972 | Canada | 220/12 |
| 907574 | 8/1972 | Canada | 220/9 |

Primary Examiner—H. Grant Skaggs
Attorney, Agent, or Firm—Barrigar & Oyen

[57] ABSTRACT

A dispensing bag for particulate matter is closed at one end by a two layer closure formed by an openable outer closure, and an inner dispersion panel with apertures of suitable size therethrough. Opening the outer closure exposes the apertures in the dispersion panel and permits particulate matter to be dispensed therethrough. The bags may be conveniently mass produced from sheet material, such as flexible plastic, in the form of a continuous strip or flattened tube, by appropriate cutting, folding, and joining operations. The invention provides an inexpensive container from which particulate matter may be conveniently dispensed in controlled fashion, and which resists accidental opening and spillage.

8 Claims, 15 Drawing Figures

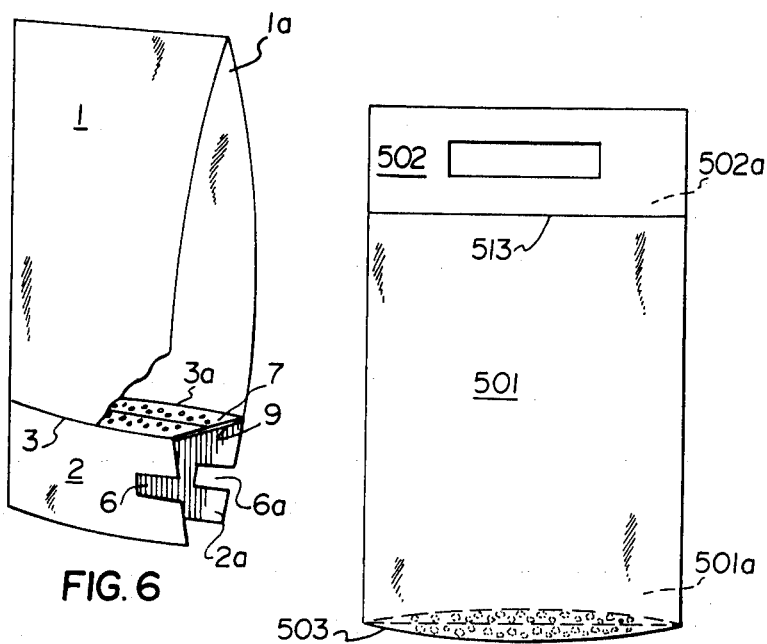
FIG. 6
FIG. 7
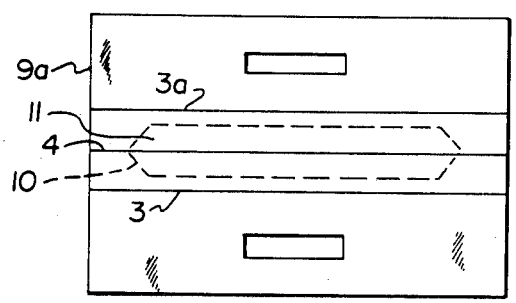
FIG. 8
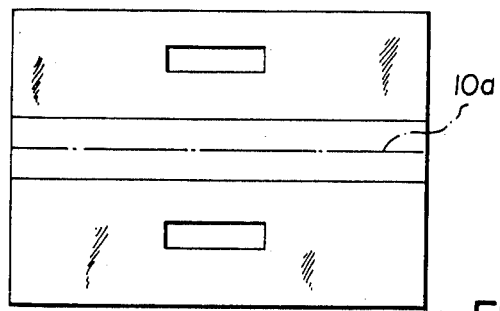
FIG. 8a

DISPENSING BAG

RELATED APPLICATION

This application is a divisional of application Ser. No. 386,537, filed June 9, 1982, and now U.S. Pat. No. 4,486,187, which is a continuation-in-part of application Ser. No. 159,438, filed June 13, 1980 and now abandoned.

FIELD OF THE INVENTION

This invention relates to the field of bags and containers and specifically to the field of containers designed to transport, store and disperse particulate matter contained therein.

BACKGROUND OF THE INVENTION

A review of the art in the field reveals a number of devices designed to store particulate matter and subsequently be used as broadcasting applicators of the particulate matter. Examples include the devices disclosed in U.S. Pat. Nos. 506,982 (issued to Diamond, Oct. 17, 1893), 3,369,709 (issued to Clauss, Feb. 20, 1968), 2,325,942 (issued to Drake, Aug. 3, 1943) and 1,123,010 (issued to Richardson, Dec. 29, 1914).

The Diamond and Clauss references both disclose perforations or apertures on the side of a bag which are covered by a flap (Diamond) or by flexible adhesive strips (Clauss). Such constructions possess disadvantages which make them ineffective for use in the selective and variable broadcasting of particulate matter from a bag or container. The use of outer perforations leaves the outer seal or panel susceptible to accidental or intentional removal and also inhibits the effectiveness of resealing the perforations (particularly with the adhesive strips of Clauss) since the outer flap or panel becomes contaminated by particulate matter after the first use. Such devices are also disadvantageous in that they are relatively expensive to manufacture (in a field where a few cents more or less per bag is crucial), the particular designs both result in significant residue remaining in the bag even after complete use and the variable rate of flow from the devices is dependent on the exposed perforations and not on the motion imparted to the bag by a user.

The Drake and Richardson references disclose dispensing envelopes which utilize apertures or perforations in the bottom of the device which are covered by a flap (Drake) or by folding the end in upon itself (Richardson). Neither device is designed for use as a storage and spreader bag for particulate matter which can be used as a fertilizer, lawn seed or insecticide broadcaster. Although larger scale models of the Drake and Richardson devices could conceivably be used as particulate matter spreaders for the foregoing purposes, such models would have the disadvantages of being expensive to manufacture, lacking in sufficient support to contain the particulate matter and providing no protection for the dispersion panel. The heavier the contents placed in such devices, the greater the likelihood of the panels or sides splitting, even while in storage or in transit, with a consequent loss of product. Actual use of these devices as applicators with particulate matter of any significant size would likely result in splitting at the seams of the bag or at the dispersion panel itself thus defeating the purpose for which the bag is being used. In addition, none of the devices reveals any inexpensive and efficient means for carrying or holding the bags while in transit or while in use.

Consequently, there is a need for a bag of inexpensive manufacture which can be used to store and transport particulate matter and subsequently be used as an applicating, spreading or broadcasting device, complete in itself, for the particulate matter contained therein. In addition, there is a need for such a bag which can be easily adapted in design to encompass a wide variety of particle sizes including finely divided material such as grass seed and relatively large particles such as rock salt. The prior art also points to a need for easily transportable particulate matter spreader bags which can be stored between uses and even refilled entirely and reused.

The present invention satisfies this need, by providing a dispensing bag for particulate matter, one end of the bag being provided with an openable outer closure, and a second, inner closure, contained within the bag when the outer closure is closed, comprising a gusset of bag material, provided with an appropriate number of apertures of appropriate dimensions, for dispensing the particulate matter.

To use the bag as a dispenser, the openable outer closure is opened, exposing apertures in the gusset, and the bag is positioned with the apertures facing downward.

In some embodiments, the diameter of the apertures is only somewhat larger than the particle diameter of the particulate matter, so that the particulate matter will generally only escape when the bag is agitated or shaken. As particulate matter tends to "bridge" the apertures, gravity alone will generally not dislodge any matter through the apertures unless they are substantially larger than the particle diameter. Use of an appropriate size of aperture will allow the user to direct the commencement and the rate of flow by means of the degree of shaking or agitation imparted to the bag. The appropriate size of aperture for a particular application will of course depend on such factors as the average size and weight of the particles and the rate of flow desired.

The present invention provides an inexpensive and efficient means whereby particulate matter may be bagged, stored, transported and subsequently dispensed with the advantages that the dispersion gusset is contained within the bag, resealing of the gusset between uses is not necessary, the rate of flow of the particulate matter may be made directly dependent on the actions of the user and the dispersion gusset may be exposed and the bag positioned for use as a dispenser with little or no initial loss of material.

In addition, since the dispersion gusset is located at the end of the bag, the entire contents of the bag may be dispensed with no consequent remaining residue such as would occur in bags with exterior perforations located on the side of the bag.

Also, this invention provides a bag which can completely protect the user from exposure to the contents when in use if the aperture size is so chosen that dispersion only occurs when the bag is agitated by the user.

A further advantage inherent in this invention is that it is of such a nature that existing bag manufacturing equipment can be easily adapted to mass-produce these bags since the only additional necessary element is the inner dispersion gusset.

BRIEF DESCRIPTION OF THE DRAWINGS

FIG. 6 is a cross-sectional view of the bag taken along line A—A of FIG. 2 with a partial sectional view of the interior of the bag;

FIG. 7 is a perspective view of an alternative embodiment of the bag;

FIG. 8 is a plan view of an alternative form of outer panel;

FIG. 8a is a plan view of a further alternative from of outer panel;

DETAILED DESCRIPTION

Figure 1:
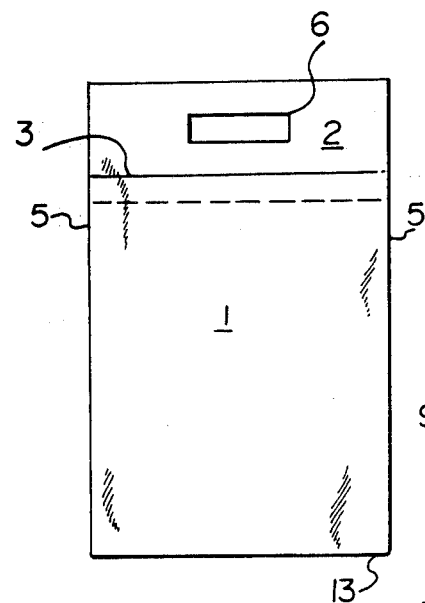
FIG. 1 is a front elevation view of the bag in the upright position.

Referring to the drawings, FIGS. 1 to 6 illustrate one embodiment of the bag of the present invention, comprising generally rectangular front and back sections 1 and 1a, joined together along their bottom and side edges.

The upper end of the bag is closed by a two-layer closure comprising rectangular outer panel 9 and congruent inner panel 7. Panel 7 is provided with apertures 8 of suitable dimension having regard to the particle size of the particulate matter for which the bag is designed, and the desired rate of flow. Panel 9 is provided with removable portion 11, defined by lines of demarcation 10 of reduced structural strength; lines 10 may be perforated lines, for example. It will be understood that alternative forms of openable panel may be substituted for panel 9.

Figure 2A:
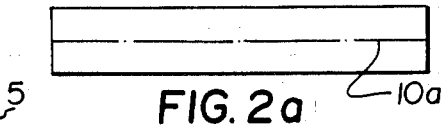
FIG. 2a is a plan view of an alternative form of outer panel.

For example, panel 9 may be a rupturable panel, as shown in FIG. 2a, having a single line 10a of reduced structural strength, along which the panel may conveniently be ruptured. Further alternative forms of openable panel will be obvious to persons skilled in the art. For example, a rupturable panel might be provided with a pull member, such as a wire or cord, for rupturing the panel along its centre line. A bag closure of this type is shown in Canadian Pat. No. 894,640, Wright, Mar. 7, 1972.

Panels 7 and 9 are folded along longitudinal center line 4, and positioned between front and back sections 1 and 1a. The front edges of the two panels are joined to the front section of the bag along line 3; the back edges are joined to the back section of the bag along line 3a. The ends of the folded panels are connected to each other and to the side edges of the front and back sections at location 5.

End portions 2 and 2a of sections 1 and 1a extend above lines 3 and 3a, and are provided with slots 6 and 6a which cooperate to form a handle at the top of the bag.

The bag may be made of any suitable material, for example, flexible plastic or reinforced paper such as are commonly used for the manufacture of bags for particulate matter. The method of joining the parts of the bag together will of course depend on the material chosen. For example, paper bags may be assembled by stitching, or glueing with suitable adhesive; plastic bags may be assembled by heat welding.

Conveniently, the bottom edges of sections 1 and 1a may be left unjoined while the remainder of the bag is assembled. The bag may then be placed in inverted position and filled with particulate matter, after which the edges of sections 1 and 1a are joined together along line 13 to close the bag, which may then be transported and stored in any position without loss of contents.

Figure 4:
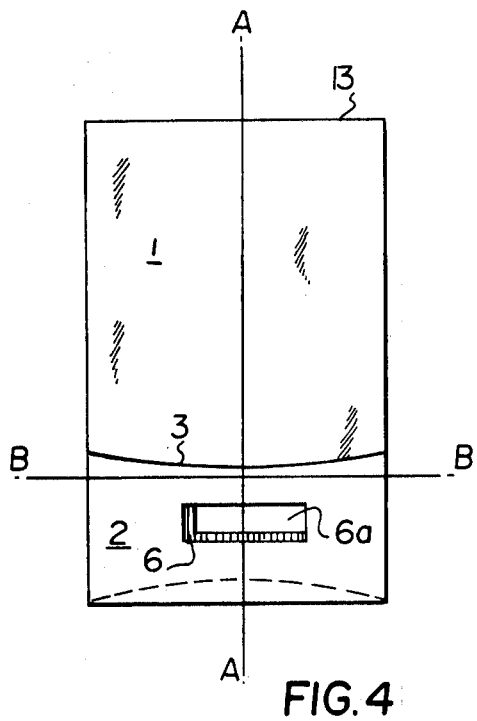
FIG. 4 is a perspective view of the bag in the inverted position.
Figure 5:
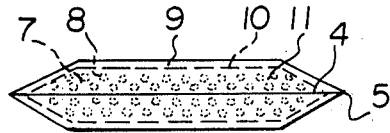
FIG. 5 is a cross-sectional bottom view taken along line B—B of FIG. 2 illustrating the outer panel and the underlying inner dispersion panel.

When the bag is in the inverted position of FIG. 4, pressure of the particulate matter within the bag causes the bag to spread, extending the middle portions of panels 7 and 9 to a generally flat, horizontal configuration, as shown in the sectional view of FIGS. 5 and 6.

To dispense particulate matter from the bag, removable portion 11 of panel 9 is removed by separation along lines 10, exposing apertures 8 through which the particulate matter is dispensed by inverting, or inverting and agitating, the bag.

If a rupturable outer panel, such as that shown in FIG. 2a, is used in place of panel 9, the apertures 8 are of course exposed by rupturing the outer panel. The outer panel may be of less width than the dispersion panel to which it is attached, so as to retain the dispersion panel in a folded configuration until the outer panel is opened. In such embodiments, when particulate matter is being dispensed, the pressure of the particulate matter will cause the dispersion panel to "pouch" out through the opening in the outer panel.

The rate at which matter is dispensed will depend on the size and spacing of apertures 8. Since particulate matter tends to "bridge" the apertures, if the apertures are of diametric dimensions only somewhat larger than the particle dimensions, particles will generally not pass through the apertures under the influence of gravity alone, but only if the bag is agitated, thereby permitting a high degree of control over the dispensing operation. If a more free flow is desired, larger apertures may be used. Obviously, the size and spacing of the apertures need not be uniform.

When a partially empty bag of this embodiment is returned to an upright position and lifted by the handle, the front and back sections are drawn together, panel 7 folding back downwardly into the bag, effectively closing the bag so that it will retain its contents when carried by the handle or suspended thereby for storage, or generally transported or stored in a reasonably upright position, without the necessity of attaching any covering over apertures 8.

Figure 2:
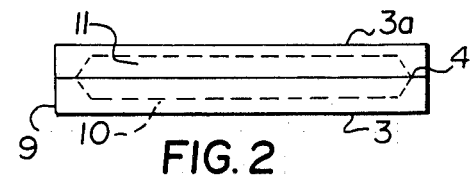
FIG. 2 is a plan view of an outer panel for said bag.

To provide a reinforced handle for the bag, one or both of the outer panels and the dispersion panel may be provided with rectangular slotted portions extending upwardly from lines 3 and 3a, congruently outer end portions 2 and 2a of the front and back sections of the bag, and joined along their edges to the edges of the respective portions 2 and 2a. FIG. 8 shows an outer panel 9a of the same type as outer panel 9 shown in FIG. 2, provided with rectangular handle portions.

Figure 3:
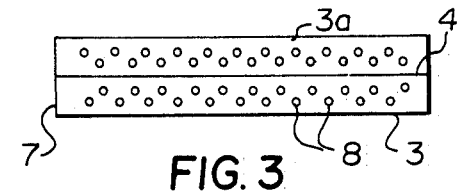
FIG. 3 is a plan view of an inner dispersion panel for said bag.
Figure 9:
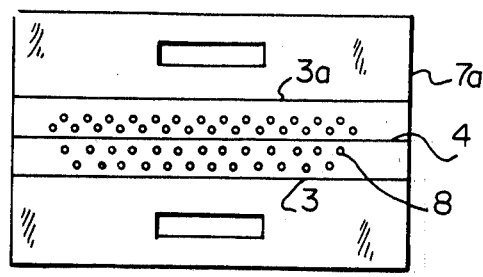
FIG. 9 is a plan view of an alternative form of inner dispersion panel.

FIG. 8a shows an outer panel of the type shown in FIG. 2a, provided with rectangular handle portions. FIG. 9 shows a dispersion panel 7a, of the same type as dispersion panel 7 shown in FIG. 3, provided with rectangular handle portions.

In the alternative embodiment of FIG. 7, a bag comprises front and back sections 501 and 501a, with inner and outer closure panels joined thereto along bottom edges 503 and 503a, in the same manner as previously described. The bag is closed at the top by joining sections 501 and 501a along line 513. Slotted portions 502 and 502a extending upwardly from line 513, and joined together along their edges, form a handle at the top of the bag. This embodiment may be more convenient for use as an applicator, although less well adapted for transportation and storage after being opened.

Many variations will be obvious to persons skilled in the art. For example, a bag could be provided with handles at both top and bottom, combining the advantages of the two described embodiments. A different form of handle could be used, for example, a handle or handles of resilient plastic material could be stitched to one or both ends of a bag formed from reinforced paper, as is sometimes done with conventional bags.

It will be understood that the various parts of the bag have been described separately in the interest of clarity, but that several, or all, of the parts described may be formed together as an integral blank of bag material, the bag then being assembled by appropriate folding and joining.

The presently preferred embodiment of the dispensing bag is so designed that the bags may be mass-produced from a continuous strip, or flattened tube, of suitable material, such as thermoplastic film, rapidly and efficiently.

Figure 10:
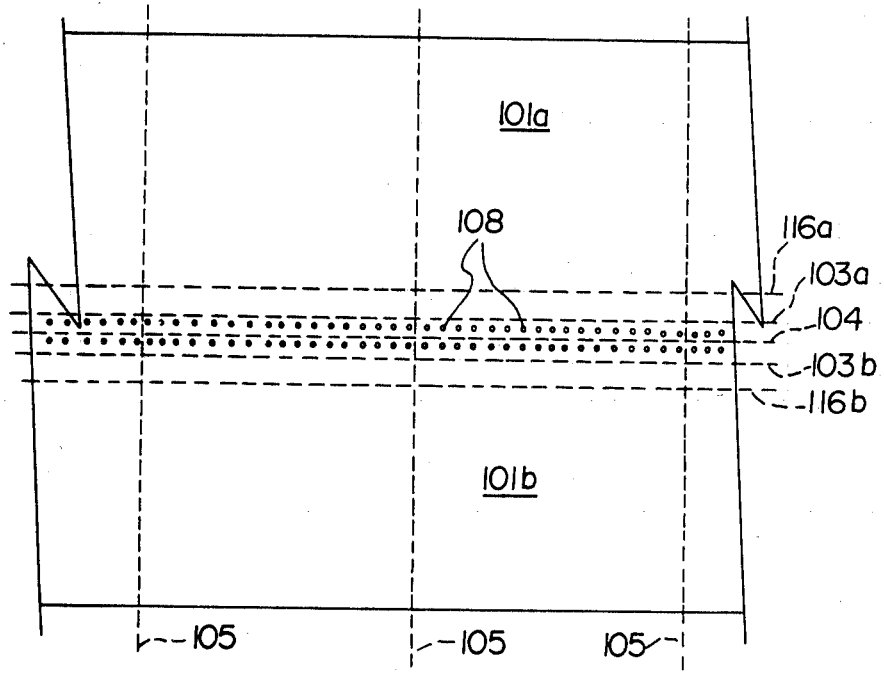
FIG. 10 is a plan view of a section of continuous strip of bag material as used in fabricating the presently preferred embodiment of the dispensing bag.

FIG. 10 illustrates a segment of a continuous strip of bag material, having dispensing apertures 108 formed in the central portion, on both sides of the longitudinal center line 104 of the strip. The dotted lines in the drawing indicate the locations at which the material is folded, joined, and cut, in the process of manufacturing the bag.

Figures 10A, 10B, 10C:
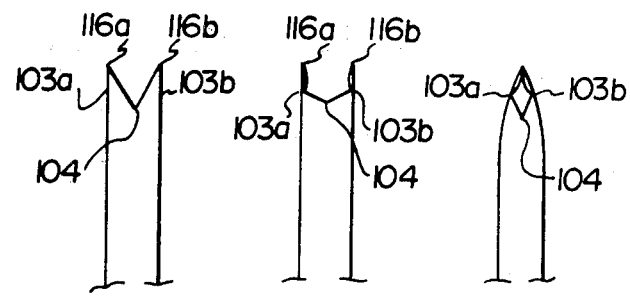
FIGS. 10a, 10b and 10c are cross-sectional views illustrating the fabrication of bags from the strip of FIG. 10.

The strip of material is folded at lines 104, 116a, and 116b, as shown in cross section in FIG. 10a, to form an inwardly projecting gusset, apertures 108 being located in the central portion of the gusset. The gusset is then joined to the adjacent portions of the material, which will ultimately form the fronts and backs of the bags, along lines 103a and 103b, as shown in FIG. 10b. Folded edges 116a and 116b are then joined together, as illustrated in FIG. 10c. Finally, the folded strip of material is then severed, and the two thicknesses of material joined together, along suitably spaced transverse lines, shown at locations 105 in FIG. 10, to produce a series of dispensing bags, open at the ends remote from the double closure which contains the dispersion panel in the form of the gusset. The open ends of the bag are, of course, closed by joining their edges together, or by other appropriate means, after the bags have been filled.

It will be understood that the bags so formed can incorporate hand holds at one or both ends, as previously described in connection with earlier embodiments. In use, the bags of this embodiment are made operational for dispensing the product, by simply separating joined edges 116a and 116b, by cutting, tearing, or other appropriate method, to expose the dispersion panel.

It will also be understood, that when the bags are formed from thermoplastic film, the necessary joining may be accomplished by thermal welding (heat sealing), and the edges of the bags may be formed by simultaneous cutting and heat sealing, using techniques well known in the art.

Persons skilled in the art will also be aware, that some manufacturers of plastic bags have integrated manufacturing facilities, wherein the thermoplastic sheet or film, is produced on site, by extrusion. A commonly used method is the bubble extrusion process, which results in the formation of a flattened tube of thermoplastic sheet or film. Dispensing bags in accordance with the presently preferred embodiment of the present invention, may be fabricated directly from such a flattened tube of material, by using a modified version of the fabrication procedure described above. In this modified procedure, the continuous flattened tube of thermoplastic sheet, is provided with dispensing apertures of suitable size, formed in the marginal areas adjacent the folded edges of the flattened tube, and penetrating both thicknesses of the sheet, whereby each row of apertures formed in the folded tube, produces two rows of apertures in the finished product. The folded edges of the flattened tube are reverse folded inwardly, to form gussets, whereby each edge of the flattened tube has the cross-sectional configuration illustrated in FIG. 10a. Joins are then made, as previously described, so that each edge of the flattened tube assumes the cross-sectional configuration shown in FIG. 10c, whereby each edge of the flattened tube contains a folded inwardly projecting gusset, having dispensing apertures therethrough. Bags are then formed by severing and sealing the material along suitably spaced transverse lines, and severing (but not sealing) the flattened tube along its longitudinal center line, whereby each segment of tube, forms two bags, open at the ends remote from the gussets.

From the foregoing description, it will be understood that the presently preferred embodiment of the dispensing bag of this invention, is particularly well adapted for rapid, convenient and inexpensive manufacture, involving only minor additions to existing types of bag manufacturing methods and equipment.

Persons knowledgeable in the art, will understand that this feature is of crucial importance, in the practical utility of the present invention. To be of practical value, articles of disposable packaging must be capable of inexpensive mass production, preferably using existing equipment with only minor modifications, to avoid unacceptable capital cost.

The foregoing particular embodiments of the dispensing bag and method of constructing same are illustrative only, and the present invention is not limited to these particular embodiments, but extends to all articles and methods within the scope and spirit of the appended claims.

What is claimed is:

1. A bag for packaging and dispensing particulate matter, comprising:
   flexible front and back sections joined together along the side edges thereof and a flexible double end closure, the double end closure comprising an openable outer closure and a flexible inner gusset having a plurality of apertures therethrough, wherein the outer closure may be opened, to expose the apertures of the inner gusset and to permit dispensing of particulate matter therethrough, wherein the front and back sections and double end closure are integral portions of the same section of flexible sheet material, the double end closure being the central portion and the front and back sections being folded over and superimposed end portions having folded end edges, wherein the inner gusset of the double end closure comprises an inwardly folded middle portion of the double end closure joined to the insides of the front and back sections along joining lines generally parallel to and approximately equidistant from the folded end edges of the front and back sections, and wherein the outer closure comprises portions of the double end closure adjacent the folded end edges of the front and back sections, which are sealed together and also sealed to the front and back sections along a sealing line generally parallel to the folded end edges of the front and back sections and remote from the joining lines of the inner gusset, whereby the outer closure is openable by severing the outer closure along a line between the sealing line and the joining lines of the inner gusset.

2. A bag as defined in claim 1, wherein the flexible sheet material is thermoplastic, for permitting the inner gusset to be joined to the front and back sections by heat sealing.

3. A bag as defined in claim 2, wherein the size, shape, number and location of the apertures in the inner gusset are selected for permitting substantially no dispensing of the particulate matter when the outer closure is opened and the bag is placed in a double end closure down orientation but not agitated.

4. A bag as defined in claim 1, wherein the inner gusset is provided with a crease along the longitudinal axis thereof, for permitting the inner gusset to fold into congruent halves when the bag is held in a double end closure up orientation, thereby substantially closing the bag.

5. A dispensing bag for particulate matter, comprising:

flexible front and back sections joined together along the side edges thereof; and a flexible double end closure connecting said front and back sections;

said double end closure comprising an openable outer closure and an inner closure gusset having a plurality of apertures therethrough, said gusset being contained within the bag when the outer closure is closed;

wherein said openable outer closure may be opened, thereby exposing said apertures and permitting particulate matter within said bag to be dispensed from said bag through said apertures, wherein the inner gusset is joined to the insides of the front and back sections along lines parallel to and remote from the end edges of the front and back sections closest to the double end closure; and wherein the openable outer closure comprises portions of the double end closure adjacent the end edges of the front and back sections which are sealed together and also to the front and back sections along a line generally parallel to but remote from the lines joining the gusset to the front and back sections.

6. A dispensing bag as defined in claim 5, wherein the bag is made from thermoplastic sheet material.

7. A dispensing bag as defined in claim 6, wherein the size, shape, number and location of the apertures in the inner closure gusset are selected for permitting substantially no dispensing of the particulate matter when the outer closure is opened and the bag is placed in a double end closure down orientation but not agitated.

8. A dispensing bag as defined in claim 5, wherein the inner closure gusset is provided with a crease along the longitudinal axis thereof, for permitting the inner closure gusset to fold into congruent halves when the bag is held in a double end closure up orientation, thereby substantially closing the bag.

* * * * *